March 1, 1932. J. F. HARKOM 1,847,648
FOAM BREAKER
Filed May 20, 1929
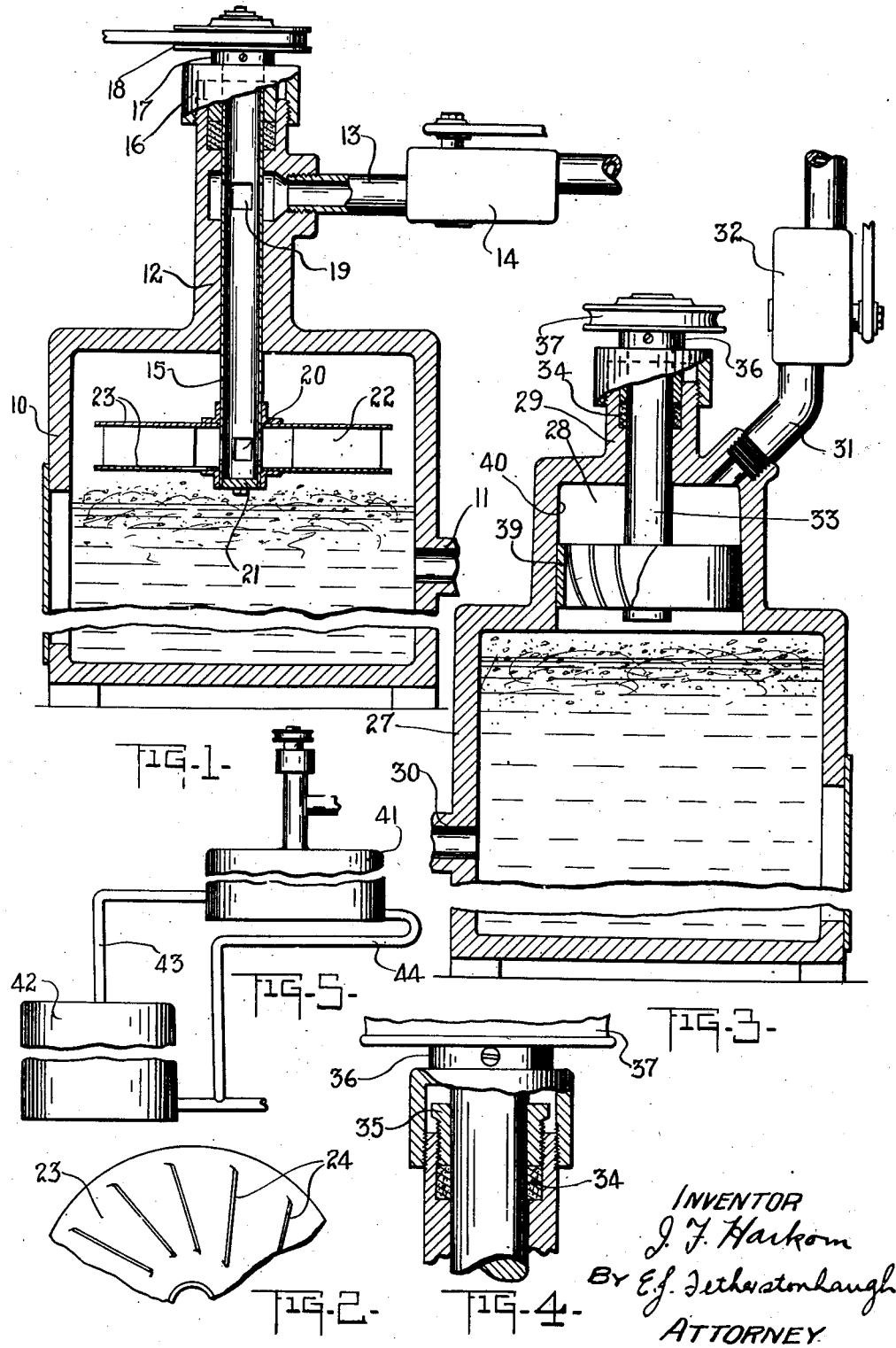
INVENTOR
J. F. Harkom
By E.J. Fetherstonhaugh
ATTORNEY Patented Mar. 1, 1932

1,847,648

UNITED STATES PATENT OFFICE

JOHN FREDERICK HARKOM, OF OTTAWA, ONTARIO, CANADA

FOAM BREAKER

Application filed May 20, 1929. Serial No. 364,674.

The invention relates to a foam breaker as described in the present specification and shown in the accompanying drawings that form a part of the same.

The invention consists essentially of the novel features of construction pointed out broadly and specifically in the claims for novelty, following a description containing an explanation in detail of an acceptable form of the invention.

The objects of the invention are to separate the exhalations in the form of moisture from the foam resulting from the heating of a body of liquid particularly foam a liquid having a higher boiling point than water, such as creosote, and heated at a pressure less than atmospheric; to construct a machine in which the heavier element may be thrown out of the foam by centrifugal force and thereby save the creosote or other liquid and the lighter element withdrawn by suction, thus ridding the creosote or other liquid of the moisture that may have been introduced thereinto during any processing, like the creosoting of wood; to retain as far as possible the original quantity of creosote and any oils or other constituents valuable to the product; to facilitate the operation of impregnating products with preservative fluids by evaporating the moisture and generally to expedite the use of preservatives for wood or other products and provide a simple durable and efficient apparatus.

In the drawings Figure 1 is a side sectional view of the device mounted in a vessel containing a foaming liquid and connected to a suction pump.

Figure 2 is a fragmentary detail of the rotor.

Figure 3 is a modified form of the device.

Figure 4 is an enlarged sectional detail of the upper portions of the shaft with packing and packing nut as shown in Figures 1 and 3.

Figure 5 is a diagrammatic view showing how the rotator may be located in a separate compartment from the vessel containing the foaming liquid.

Like numerals of reference indicate corresponding parts in the various figures.

Referring to the drawings, the cylinder or vessel containing the foaming liquid is indicated by the numeral 10 and has the outlet pipe 11 leading thereinto. The vessel walls extend upwardly and merge into a neck portion 12 having an outlet pipe 13 offset therefrom and connected to a suction pump 14.

The hollow rotator shaft 15 projects downwardly and centrally through the neck portion 12 of the vessel 10 and is journalled therein and has a collar 16 engaged with the top portion 17 of the vessel neck and which forms the suspension member. The shaft 15 is engaged at its upper end by a pulley 18 which is suitably connected to an operating mechanism. The hollow rotator shaft has a plurality of openings 19 adapted to come into register on the rotation of the shaft with the outlet pipe 13. A series of openings 20 is also made towards the lower end of the hollow shaft which is plugged below said openings 20 by a block 21.

The revolving runner or rotator 22 is rigidly secured to the hollow shaft 15 and is formed of a pair of spaced plates 23 having therebetween the short vanes or blades 24 of suitable curvature extending outwardly to edge of the plates 23 from the outer boundary of the annular vacuum chamber 45, surrounding the shaft and communicating therewith through the opening 20 leading into the interior.

In the modified form of the invention as shown in Figure 3 the casing or vessel 27 extends at its upper end into a central chamber 28 and terminates upwardly therefrom in a neck 29. The inlet pipe 30 is connected to the lower part of the vessel and the outlet or discharge pipe 31 extends into the upper portion of the central chamber and may be suitably connected to a suction pump 32.

A solid shaft 33 is journalled in the neck 29 and as in the other form described has a packing 34 and packing gland 35 together with the collar 36 and pulley 37 which is connected to a suitable power. A series of vertical vanes or blades 38 extend between the solid shaft and outer ring 39 which slides on the inner face 40 of the central chamber 28.

Each of the various forms of the device herein described can be treated as a separate foam destroying unit and connected to the output of an existing apparatus as brought out in Figure 5 wherein the foam destroying unit is indicated by the numeral 41 and the mass container is indicated by the numeral 42 having the foaming liquid. This container 42 has the output pipe 43 leading up into the foam destroying unit 41 which has the pipe 44 leading back into the mass container. The foam destroying unit may be placed above the mass container from which it draws up the foam through the output pipe 43 and when a creosote or oil is separated from the gas or vapour it gravitates down the pipe 44 to the mass container where it mixes up with the other liquids used in processing.

In the operation of the device as shown in Fig. 1, which is the preferred form, the outlet 13 is connected to an air or vacuum pump and the shaft 14 is rotated. The rotation of the vanes in the direction indicated by the arrow Fig. 2, will cause a slight pressure of a few inches of water within the vessel 10. The vacuum applied at 13 of Fig. 1, of 1" to 29" of mercury easily overcomes the slight pull of the rotor and the air is exhausted from the vessel 10, producing a vacuum in the vessel 10 only slightly lower than the applied vacuum.

If there is any water in the oil 11 in the vessel 10 the application of vacuum and heat to the vessel 10 will cause violent foaming. The foam rises and under the influence of the vacuum applied at 13 advances into the passages between the vanes. The centrifugal force caused by the rotation of the unit throws back the liquid constituents of the foam but the vapour constituents of the foam are drawn through the vanes and up the shaft 15 to the outlet 13.

In the operation of the form shown in Figure 2 the method is practically the same with the exception that the shaft is solid and that the vanes are vertical, the foam is drawn up in the same way by the vacuum applied at 29 until it reaches the blades, which being made of special formation throw the liquid in a downwardly lateral direction and allow the vapour or gas to proceed into the central chamber and out through the discharge pipe.

Various changes may of course be made from time to time according to the requirements without in any way departing from the essential features of this apparatus.

What I claim is:—

1. In a foam breaker, a vessel projecting to form a neck in its upper portion and having an inlet in the lower portion and a discharge opening forming an offset from the neck portion, a hollow rotatory shaft journalled in the neck portion having openings around its circumference adapted to come into alignment with the discharge opening, said hollow shaft extending downwardly and beyond the neck portion into said vessel and having a rotator secured to its lower end, said rotator being formed of a series of spaced plates having a plurality of vanes therebetween, the lower portion of the hollow shaft between said plates having a series of openings around its circumference.

2. In a foam breaker, a vessel having a neck in its upper portion and an inlet in the lower portion and an outlet forming an offset from the neck portion, a hollow rotatory shaft journalled in the neck portion and having a rotator secured to its lower end, said rotator having a pair of spaced plates secured to said shaft and comprising a series of curved vanes terminating to form a space between themselves and the hollow shaft, said hollow shaft having a series of openings around its circumference adjacent to said space formed by the vanes, and a suction member adapted to apply its energy through said hollow shaft.

3. In a foam breaker, a vessel projecting upwardly to form a neck and having an inlet and an outlet at its lower end and an outlet in its neck portion, a hollow rotatory shaft journalled in said neck portion and having a rotatory member and an inlet at the lower end and having a passageway therethrough to an outlet towards the upper end, said outlet coinciding with the outlet in said neck portion, a suction member connected to the outlet at the neck portion and a mass container having an outlet pipe leading into the inlet pipe of the vessel and an inlet pipe leading from the lower outlet pipe of the vessel.

Signed at the city of Ottawa, this 20th day of March, 1929.

JOHN FREDERICK HARKOM.